(12) United States Patent
Buller

(10) Patent No.: US 9,421,472 B2
(45) Date of Patent: Aug. 23, 2016

(54) HOLDER FOR GAME CONTROLLER

(71) Applicant: Jonathan Blake Buller, Temecula, CA (US)

(72) Inventor: Jonathan Blake Buller, Temecula, CA (US)

(*) Notice: Subject to any disclaimer, the term of this patent is extended or adjusted under 35 U.S.C. 154(b) by 29 days.

(21) Appl. No.: 14/267,583

(22) Filed: May 1, 2014

(65) Prior Publication Data

US 2015/0190720 A1 Jul. 9, 2015

Related U.S. Application Data

(60) Provisional application No. 61/923,371, filed on Jan. 3, 2014.

(51) Int. Cl.
*A63F 9/24* (2006.01)
*A63F 13/98* (2014.01)
*A63F 13/24* (2014.01)

(52) U.S. Cl.
CPC .............. *A63F 13/98* (2014.09); *A63F 13/24* (2014.09)

(58) Field of Classification Search
CPC ........ A63F 13/02; A63F 13/98; H04M 1/04; F16M 11/041; F16M 13/00
See application file for complete search history.

(56) References Cited

U.S. PATENT DOCUMENTS

| | | |
|---|---|---|
| D252,899 S | 9/1979 | Campbell |
| D273,165 S | 3/1984 | Sternberg |
| D278,102 S | 3/1985 | Wagner, Jr. |
| D281,657 S | 12/1985 | Roczey |
| D287,365 S | 12/1986 | Judd |
| D316,347 S | 4/1991 | Getto |
| D320,027 S | 9/1991 | Mintz et al. |
| D330,147 S | 10/1992 | Garber |
| D332,360 S | 1/1993 | Golds |
| D337,762 S | 7/1993 | Crane |
| D338,453 S | 8/1993 | Martin |
| D351,147 S | 10/1994 | Hill |
| D361,452 S | 8/1995 | Neylon |
| D363,619 S | 10/1995 | Karnaze |
| D368,605 S | 4/1996 | Lechleiter |
| D371,220 S | 6/1996 | Behrens |
| D391,098 S | 2/1998 | Northrop |

(Continued)

OTHER PUBLICATIONS

Xbox 360 Controller Cradles by Intec. Amazon.com. Online. Dec. 30, 2006. Accessed via the Internet. Accessed Jul. 23, 2015. <URL: http://www.amazon.com/Xbox-360-Controller-Cradles/dp/B000GDH51S>.*

(Continued)

*Primary Examiner* — Dmitry Suhol
*Assistant Examiner* — Carl V Larsen
(74) *Attorney, Agent, or Firm* — Kirk A. Buhler; Buhler & Associates

(57) ABSTRACT

Improvements in a holder for a game controller that allows a game controller to sit in a vertical on a stand or holder. The storage in a vertical orientation reduces the footprint of the controller on a desk or shelf. This also allows for better visual appearance of the controller as it sits on a desk. The holder further places the controller in a position where it can be more quickly retrieved for use. An internal battery compartment provides for easy access to replacement batteries without requiring the user to search for spare batteries. A support leg can be folded in front or underneath the stand to alter the stability of the controller. A charger can be incorporated into the stand to charge the controller and/or the internal stored batteries. The controller can be used in the holder without restrictions of use.

8 Claims, 9 Drawing Sheets

(56) References Cited

U.S. PATENT DOCUMENTS

| | | | |
|---|---|---|---|
| D411,824 S | 7/1999 | Wilson, Sr. et al. | |
| D435,253 S | 12/2000 | Oden, II et al. | |
| D468,305 S | 1/2003 | Ma et al. | |
| D469,073 S | 1/2003 | Muenscher et al. | |
| D489,412 S | 5/2004 | Hsu | |
| 6,789,771 B1 * | 9/2004 | Shick et al. | 248/121 |
| D501,191 S | 1/2005 | Siebke | |
| D501,617 S | 2/2005 | Katz | |
| D502,913 S | 3/2005 | Fukami et al. | |
| D510,208 S | 10/2005 | Klimas | |
| D523,809 S | 6/2006 | Roth et al. | |
| D529,440 S | 10/2006 | Lodato et al. | |
| D532,746 S | 11/2006 | Meyers et al. | |
| D540,802 S | 4/2007 | Hussaini et al. | |
| D545,319 S | 6/2007 | Griffin | |
| D549,707 S | 8/2007 | Depay | |
| D568,809 S | 5/2008 | Izumo | |
| D574,375 S | 8/2008 | Prest et al. | |
| 7,625,286 B2 | 12/2009 | Hamada | |
| 7,697,963 B1 | 4/2010 | Pomery | |
| D615,491 S | 5/2010 | Emminger | |
| 7,762,553 B2 * | 7/2010 | Harris | 273/148 B |
| 7,772,802 B2 | 8/2010 | Manico et al. | |
| D626,558 S | 11/2010 | Julien | |
| D634,708 S | 3/2011 | Cowan et al. | |
| D636,395 S | 4/2011 | Anderson et al. | |
| 7,942,747 B2 | 5/2011 | Cole | |
| D647,525 S | 10/2011 | Seto | |
| D647,881 S | 11/2011 | Warner | |
| 8,054,295 B2 | 11/2011 | Henty | |
| D652,795 S | 1/2012 | Attanasio | |
| 8,110,268 B2 * | 2/2012 | Hegemier et al. | 428/40.1 |
| D666,025 S | 8/2012 | Cobbett et al. | |
| D674,381 S | 1/2013 | Ma | |
| D675,323 S | 1/2013 | Spainhower | |
| D685,366 S * | 7/2013 | Ding | D14/253 |
| D697,477 S * | 1/2014 | Jonas, III | D13/108 |
| 2002/0068532 A1 * | 6/2002 | Wong | H04M 1/0216 455/575.1 |
| 2002/0125391 A1 * | 9/2002 | Jackson | 248/309.1 |
| 2002/0132651 A1 | 9/2002 | Jinnouchi | |
| 2003/0109314 A1 * | 6/2003 | Ku | 463/47 |
| 2004/0097127 A1 * | 5/2004 | Smith | H04M 1/04 439/533 |
| 2005/0243522 A1 * | 11/2005 | Nilsen et al. | 361/716 |
| 2006/0238164 A1 * | 10/2006 | Rosal et al. | 320/115 |
| 2007/0124778 A1 | 5/2007 | Bennett et al. | |
| 2007/0207862 A1 | 9/2007 | Calhoun | |
| 2008/0001355 A1 * | 1/2008 | Sparling | 273/148 B |
| 2008/0064504 A1 * | 3/2008 | Cole | 463/47 |
| 2008/0153594 A1 | 6/2008 | Zheng | |
| 2008/0230987 A1 * | 9/2008 | Jackson | 273/148 B |
| 2009/0072784 A1 | 3/2009 | Erickson | |
| 2009/0213081 A1 | 8/2009 | Case, Jr. | |
| 2009/0325717 A1 * | 12/2009 | Lee-Him | 463/47 |
| 2010/0234099 A1 | 9/2010 | Rasmussen et al. | |
| 2010/0298053 A1 | 11/2010 | Kotkin | |
| 2013/0221923 A1 * | 8/2013 | Robertson | 320/112 |
| 2014/0235359 A1 * | 8/2014 | Navid | 463/47 |

OTHER PUBLICATIONS

Unboxing & Install: Skinit XBOX 360 Controller Skins. Youtube. com. Online. May 22, 2011. Accessed via the Internet. Accessed Jul. 25, 2015. <URL: https://www.youtube.com/watch?v=RV71yBB1rHU>.*

* cited by examiner

HOLDER FOR GAME CONTROLLER

CROSS REFERENCE TO RELATED APPLICATIONS

This application claims the benefit of Provisional Application 61/923,371 filed Jan. 3, 2014 the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention relates to improvements in a holder for a game controller. More particularly, the present holder for a game controller configured for a wireless game controller. The holder allows for the game controller to sit in a vertical orientation and with a foldable leg and a compartment for spare batteries.

2. Description of Related Art Including Information Disclosed Under 37 CFR 1.97 and 1.98.

For people who play video games, the video game typically is played with a user holding a game controller with one or more hands. When a person is not playing the person typically place the controller on a shelf. The shape of a hand controller is typically an elongated rectangular, and when the controller is placed on a shelf the shape of the controller occupies a large footprint on the shelf. Placing the controller in a vertical orientation occupies less shelf place.

Modern wireless game controller also operate with batteries that require recharging or replacement. Batteries are typically charged or held in a separate location. When replaceable batteries are used the batteries are stored away from the controller where the replacement batteries are not easily accessed. Another problem when a remote is being used is when a person sets the remote onto a surface or lift the remote from a table the buttons can be pressed that changes what is being viewed can change.

A number of patents and or publications have been made to address these issues. Exemplary examples of patents and or publication that try to address this/these problem(s) are identified and discussed below.

U.S. Pat. No. D363,619 issued on Oct. 31, 1995 to Christopher Karnaze discloses a Remote Control Holder for Electronic Equipment. This patent is for remote controllers for a TV, stereo, cable box, DVD player or the like. The holder has a flat portion with lips that prevents the remotes from sliding off the front or sides of the holder. While this device holds one or more remotes it is not configured for a video game controller and further does not include a compartment for spare batteries.

U.S. Pat. No. D501,617 issued on Feb. 8, 2005 to Denis Katz discloses a Remote Control Caddy for holding remote controls for audio/video equipment or remote controls. While a user could place a game controller into the holder the holder is not configured to retain video game controllers and does not have a foldable stand that is found in this disclosure.

U.S. Pat. No. 7,942,747 issued on May 17, 2011 to Randall C. Cole discloses a Video Game Controller Rack. The rack provides a safe convenient and practical way of storing game controllers when the game controller is not in use by a gamer. The rack provides for multiple game controllers to be stored in vertical holders. While the rack stores controllers the rack is a static device with fixed elements and does not provide for storage of batteries or adjustability.

What is needed is a stand configured to hold a game controller where the controller sits in a vertical orientation and with a foldable leg and a compartment for spare batteries as found in the proposed disclosure.

BRIEF SUMMARY OF THE INVENTION

It is an object of the holder for a game controller to allow the game controller to sit in a vertical on a stand or holder. Storing the controller in a vertical orientation reduces the footprint of the controller on a desk or shelf. This also allows for better visual appearance of the controller as it sits on a desk. The holder further places the controller in a position where it can be more quickly retrieved for use. The holder also allows for a more neat appearance of the controllers as opposed to the controller being randomly placed within or on a shelf or desk.

It is an object of the holder for a game controller to have a foldable leg that allows the holder to fold out and allow the stand to exist in more than one position. The leg can be folded behind the controller to provide a broader base for the controller to sit in a more vertical orientation or can be folded forward in front of the mounting base where the leg is in an more compact area for storage, packaging and to provide access to a battery compartment.

It is an object of the holder for a game controller to include skin coverings that can be used to provide a custom appearance of the game holder. The skins can be specific for the gaming system or can be included with a particular game to provide an appearance that covers one or multiple surfaces of the holder.

It is an object of the holder for a game controller to provide an enlarged grip area for the remote control that allows a user to safely hold the game controller without fear of activating the buttons and controls as the person lifts the holder and game controller and sets the holder and game controller down as a single unit.

It is another object of the holder for a game controller for the buttons of the controller to still be available while the game controller is in the holder. This allows a user to activate all of the remote functions while the game controller is retained in the holder without restricting or limiting the controls.

It is another object of the holder for a game controller to have an internal battery storage compartment. The battery compartment provides for easy access to replacement batteries without requiring the user to search for spare batteries especially critical when the user is in the middle of game playing where loss of control from dead batteries can be the difference between completing a level and starting the same level from the beginning.

It is still another object of the holder for a game controller to provide charging for stored batteries and or the batteries in the game controller. This allows a user to be using a first set of rechargeable batteries in a controller while a second set of batteries are being charged. This ensures that a charged set of batteries are quickly available to enable a user to play for a nearly infinite amount of time.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

DETAILED DESCRIPTION OF THE INVENTION

Figure 1:
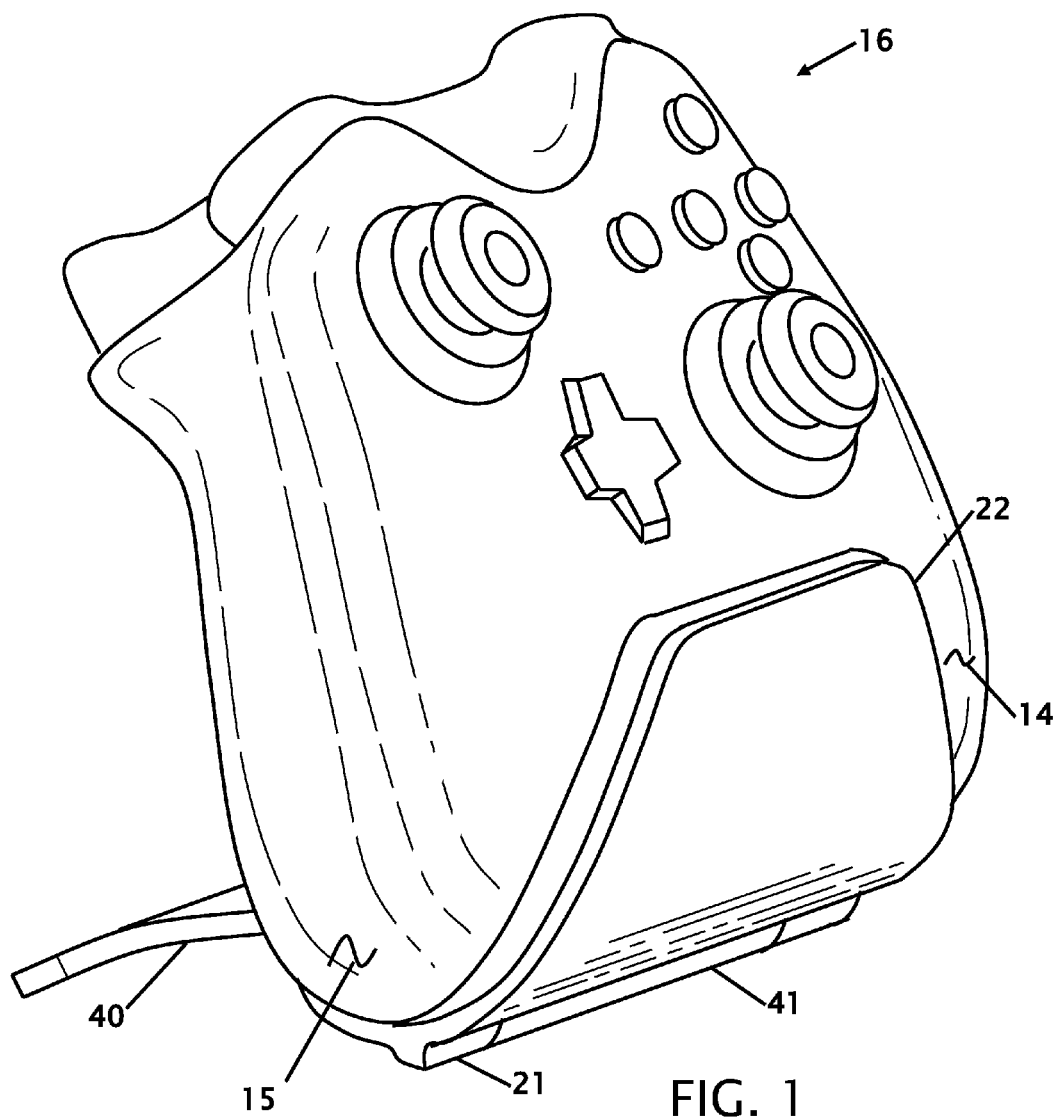
FIG. 1 shows a perspective view of the stand with a game controller retained within the holder.

FIG. 1 shows a perspective view of the stand with a game controller 16 retained within the holder. While this figure may show a particular wireless game controller, the game controller 16 can take a different visual appearance and the retainer or stand is configured to accommodate the particular geometry of the wired or wireless controller 16. In this preferred embodiment the holder has a rear leg 40 with a front 22 and a rear (not shown) supporting cradle. The holder further includes a base surface with an extending surface(s) 21 and 41 to elevate the stand. The surface 21 and 41 can include feet, texture or surface treatment that increases the coefficient of friction between the surfaces 21, 41 and the contact surface of the rear leg. This reduces movement of the stand and a game controller when the game controller is being used in the stand. The game controller has two separate hand grips 14 and 15 and the stand supports the game controller 16 by retaining the game controller 16 between the two separate hand grips 14 and 15.

When the game controller is placed into the stand the stand provides an enlarged grip area for the remote control that allows a user to safely hold the game controller without fear of activating the buttons and controls as the person lifts the holder and game controller and sets the holder and game controller down as a single unit. The stands does not restrict use of the functions of the game controller. A user can use the game controller while the game controller is installed on the stand while the stand is sitting on a table, desk or other surface. Game controllers generally have curved surfaces to conform to the hand or hands of a user. Because the surfaces are curved, activation of a button while the game controller is sitting on a curved housing will cause the controller to rock on the curved surface and thereby making the controller unstable.

Figure 2:
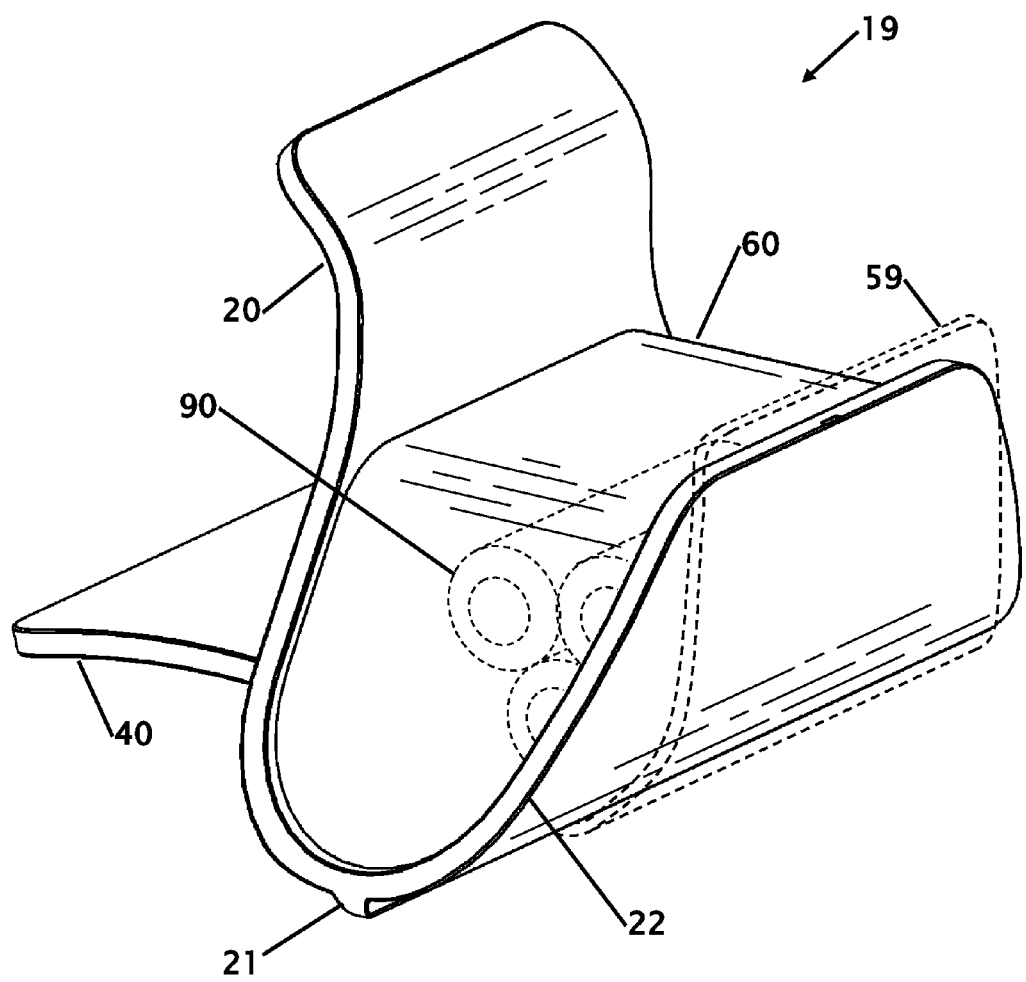
FIG. 2 shows a perspective view of the holder with the leg (in phantom) folded in front of the housing. This figure also shows the internal compartment with the batteries also in phantom.

FIG. 2 shows a perspective view of the holder 19 with the leg 59 (in phantom) folded in front of the housing. This figure also shows the internal compartment with the batteries 90 also in phantom. The supporting member 20 has a shape that extends from the back of an installed controller (not shown installed in this view) to the front 22 of a controller to provide support to the front and the back of a hand controller. The supporting leg 40 is hinged through the bottom of the supporting member 20 to allow the leg 40 to pivot from the back to the front of the supporting member 20.

In the rear deployed position the leg 40 provides additional support to prevent the stand, and an installed controller, from rocking back. When the leg is rotated to the front position 59 the leg provides additional protection to the front of the controller and also provides a denser package for sales packaging, shipping and transportation. The bottom of the supporting member has a tab or foot 21 that extends from the bottom of the supporting member 20 to elevate the supporting member 20 from a desk, table or shelf. A mid cover 60 extends from the sides of the supporting member 20 to wrap around the internal cavity created by the supporting member 20 and encloses replacement batteries 90. It is contemplated that the holder can include charging capability for charging the spare batteries and or an installed controller.

Figure 4:
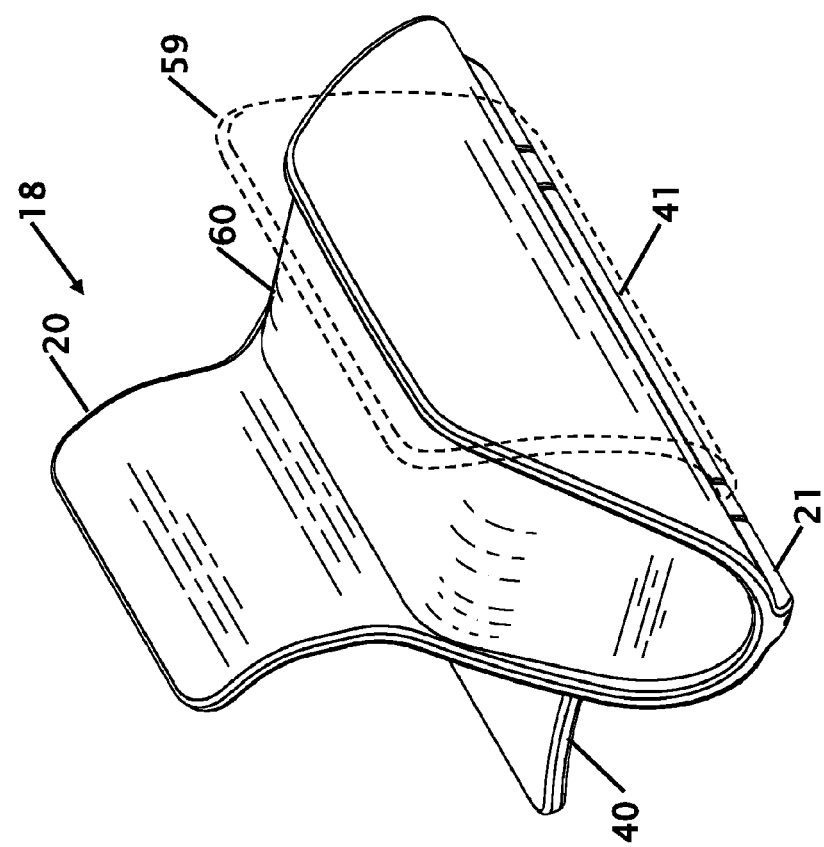
FIG. 4 shows the holder without the hand grip detents.
Figure 3:
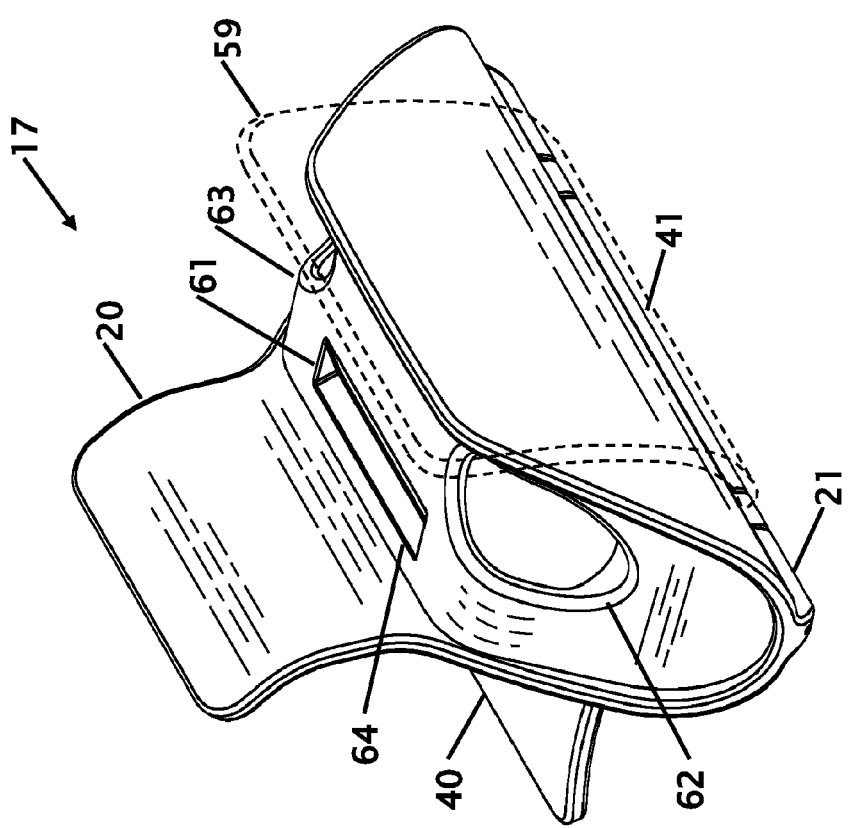
FIG. 3 shows the holder configured with detents for the hand grips of the controller.

FIG. 3 shows the holder 17 configured with detents for the hand grips of the controller, and FIG. 4 shows the holder 18 without the hand grip detents. These two different embodiments are shown side-by-side to provide different variations to support controllers with different geometric configurations. The holders can be game controller specific or can be a generic shape that accommodates game controllers from different gaming systems and manufacturers. Both figures show the leg 20 is the rear and in the rotated forward 59 configurations.

In the configuration shown in FIG. 3, detents 62 and 63 are shown on the sides of the mid cover. These detents allow for clearance of handles on the game controller (not shown). A depression 61 is also shown to provide clearance from the hand controller. It is contemplated that the mid covers can be interchangeable to accommodate different game controllers while the supporting member 20 remains unchanged. In these embodiments the supporting member has a lower tab 21 and the leg 40 further has a supporting tab 41 to support the holder above a desk table or shelf. More detailed images of the specific components are shown in FIGS. 5 and 6.

Figure 5:
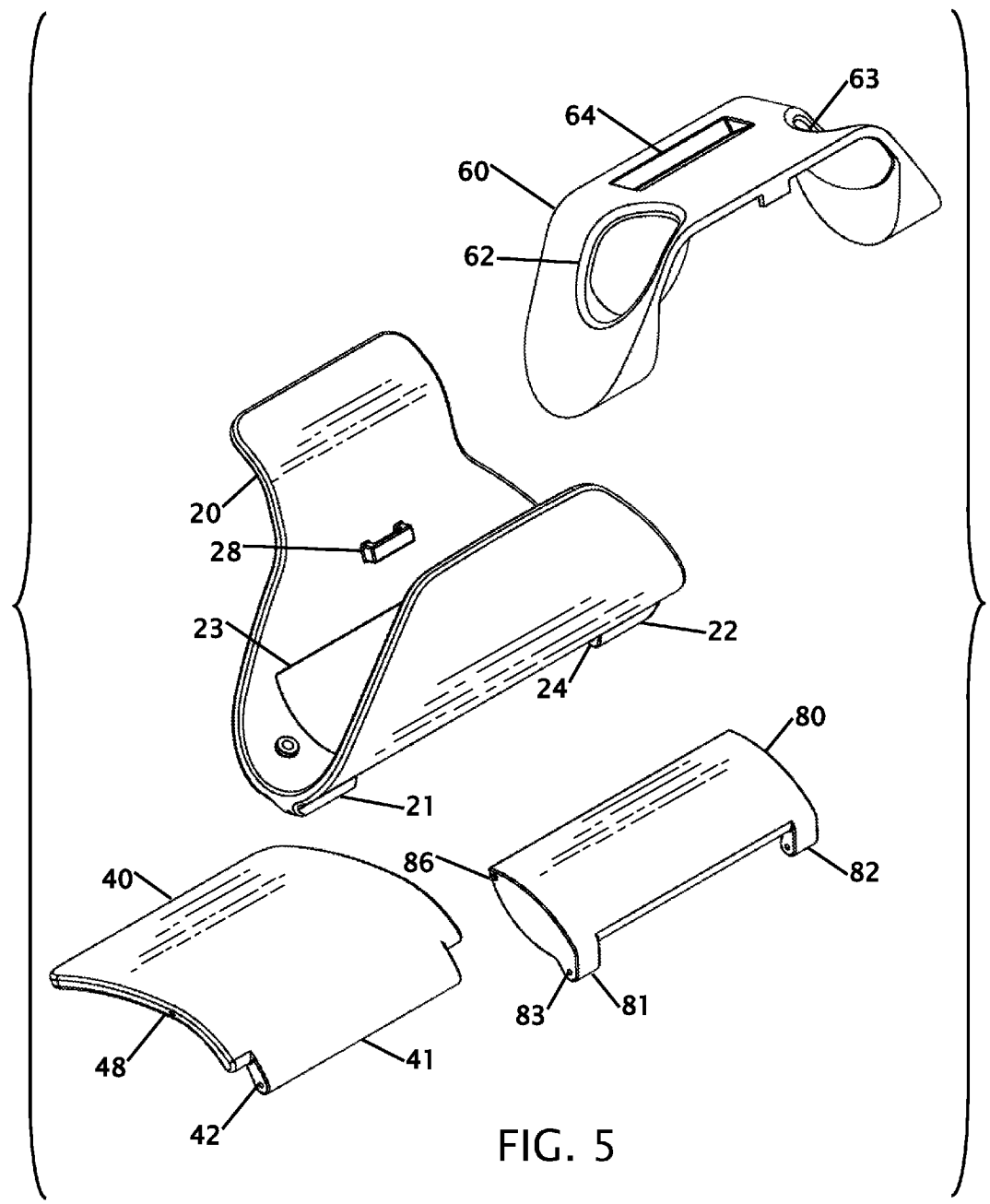
FIG. 5 shows an exploded view of the holder with the detents for the handles of the controller.
Figure 6:
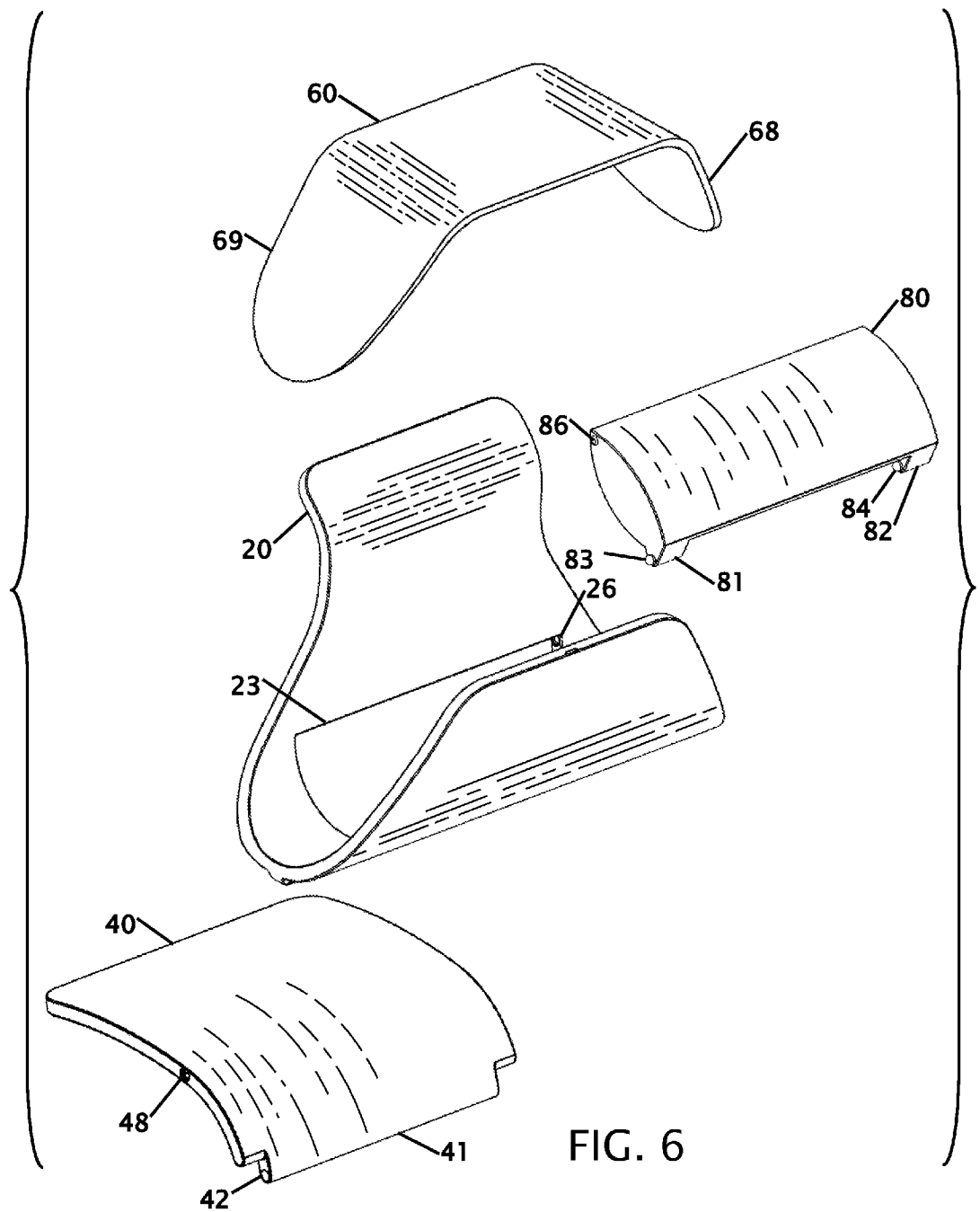
FIG. 6 shows an exploded view of the holder without the detents for the handles of the controller.

FIG. 5 shows an exploded view of the holder with the detents for the handles of the controller and FIG. 6 shows an exploded view of the holder without the detents for the handles of the controller. The supporting member 20 is shown with supporting feet or tabs 21 and 22. An opening 23 provide clearance for access to a compartment for storing a spare set of batteries or a battery pack. In FIG. 5 a tab, loop or hook 28 is shown for retaining the mid cover 60. The mid cover 60 bridges over the sides 68 and 69 the spare battery compartment and provides a lower support for an installed hand controller (not shown). The mid cover 60 shown in FIG. 5 shows the recesses to accommodate hand controller geometry.

The leg 40 shows tabs 42 for pivoting the leg in recesses 24 in the supporting member 20. The leg 40 further includes tabs 48 that engage into the supporting member 20 to provide a lock that prevents the leg from freely rotating. The battery cover 80 is secured into the supporting member 20 with hinge pins 83, and 84 on tabs 81 and 82 that engage into the supporting member 20. Tabs 86 engage into holes 26 in the supporting member 20 to retain the battery cover in a closed configuration.

These embodiments show a snap together design where the components are held together with locking tabs. It is further contemplated that the components could be held together with adhesives, ultrasonic heat staking or fasteners without altering the features or function of the holder.

Figure 7:
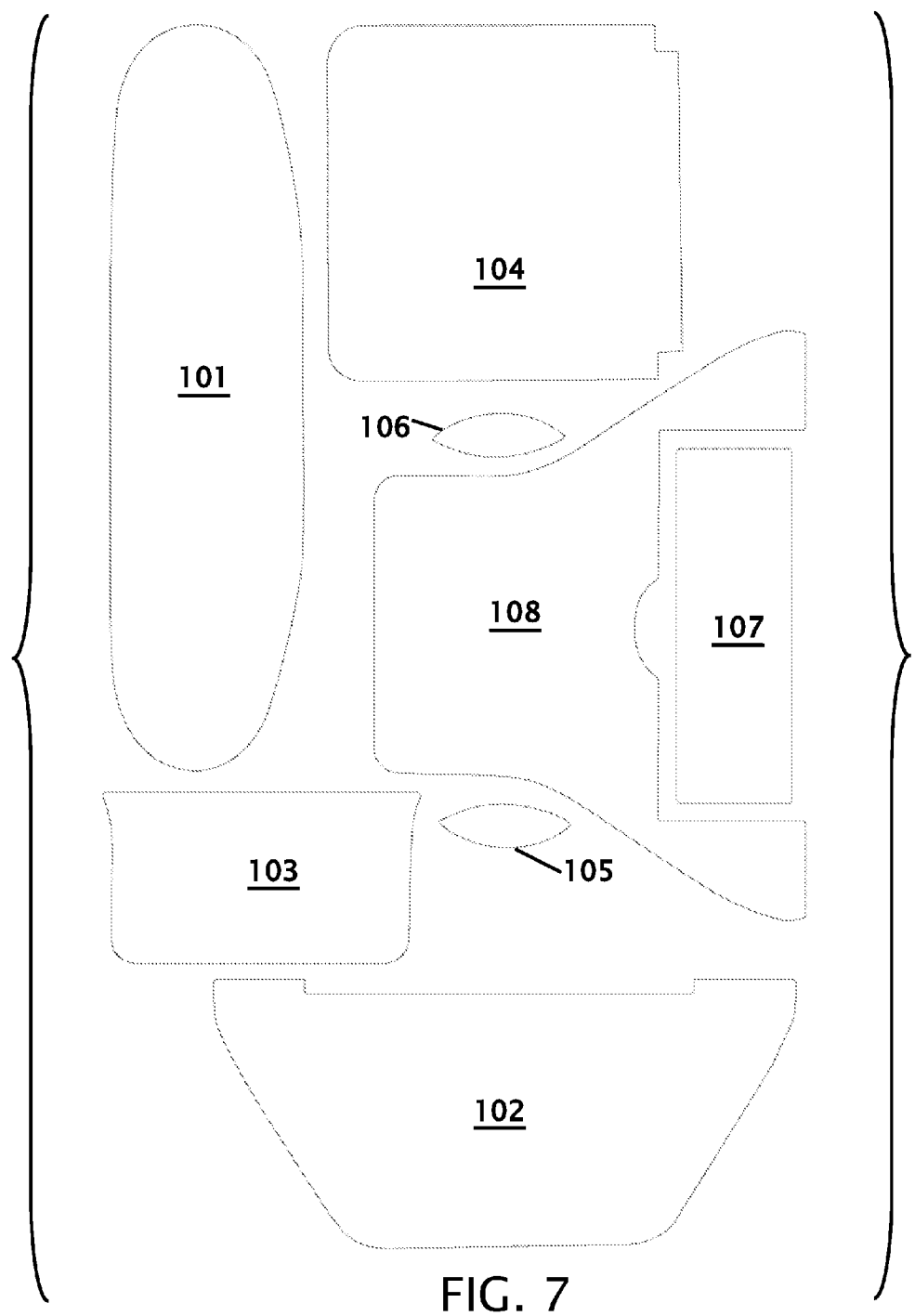
FIG. 7 shows a skin detail for the holder in a first preferred embodiment.
Figure 8:
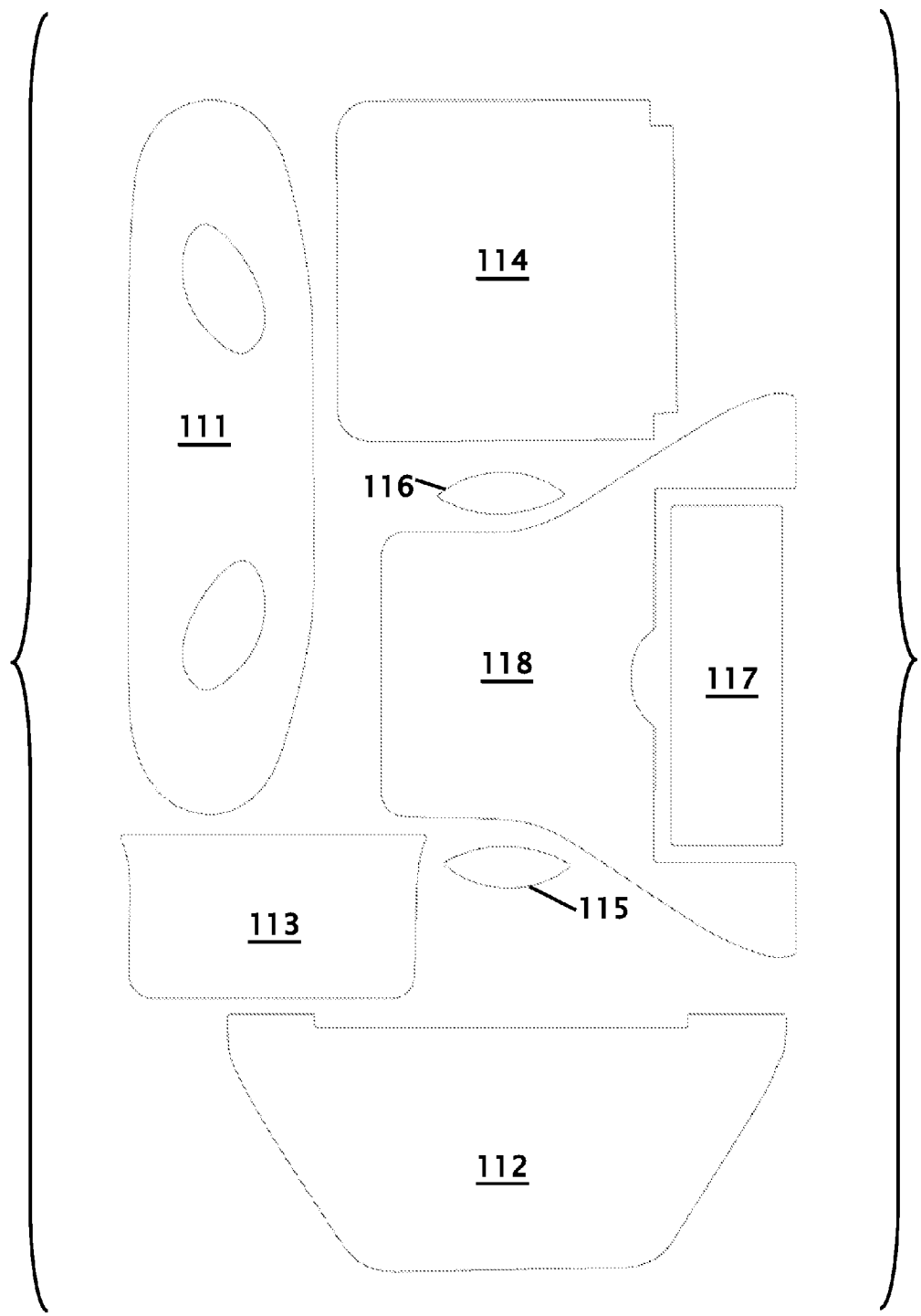
FIG. 8 shows a skin detail for the holder in a second preferred embodiment.
Figures 9A, 10A:
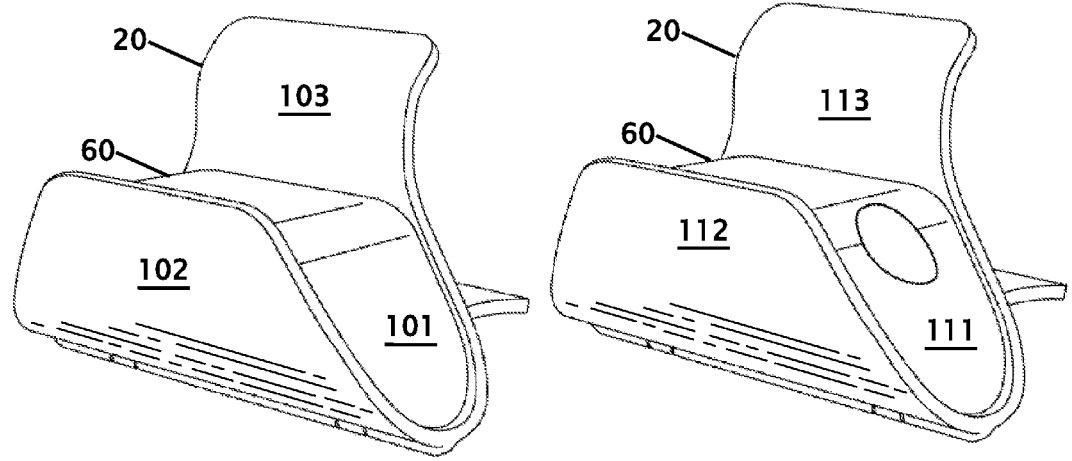
FIG. 9A shows a first perspective view of the holder with detents showing decal placement.
FIG. 10A shows a first perspective view of the holder without detents showing decal placement.
Figures 9B, 10B:
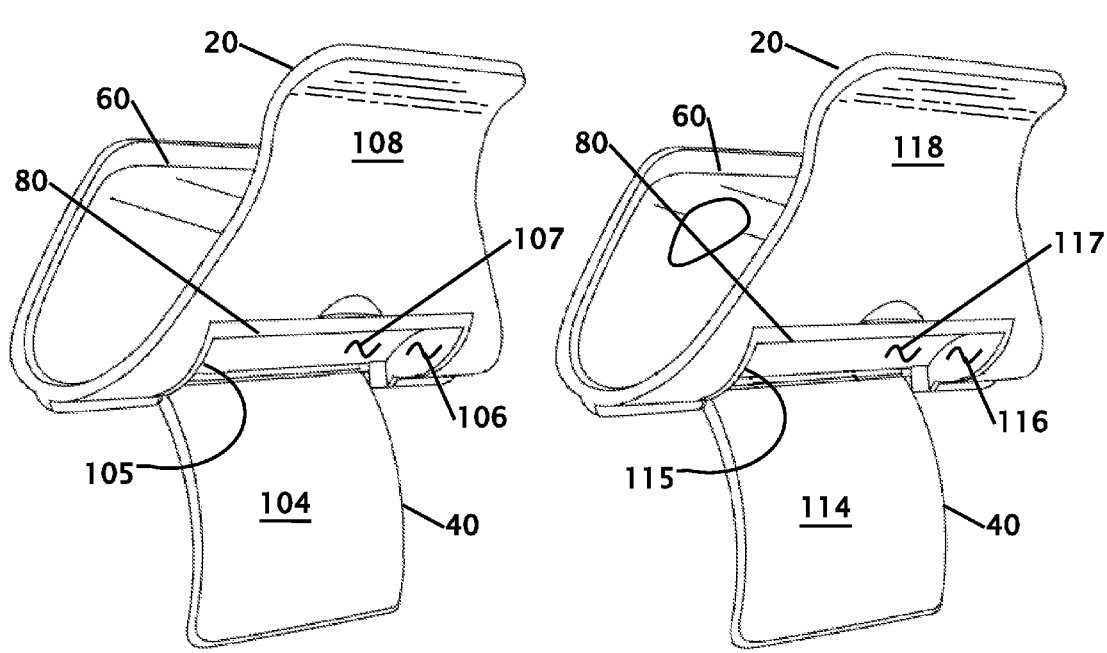
FIG. 9B shows a second perspective view of the holder with detents showing decal placement.
FIG. 10B shows a second perspective view of the holder without detents showing decal placement.

FIG. 7 shows a skin detail for the holder in a first preferred embodiment and FIG. 8 shows a skin detail for the holder in a second preferred embodiment. The placement of the skins are shown in figure FIG. 9A that shows a first perspective view of the holder with detents showing decal placement, FIG. 9B that shows a second perspective view of the holder with detents showing decal placement FIG. 10A that shows a first perspective view of the holder without detents showing decal placement and FIG. 10B that shows a second perspective view of the holder without detents showing decal placement. The decals or skins provide a temporary image for a particular game or gaming station that can be user installed and removed.

The supporting member 20 has a skin 103 or 113 that covers the front of the vertical rear portion. Skin 108 or 118 covers the rear surface of supporting member 20. Skin 102 or 112 covers the front surface of the supporting member 20. The battery cover 80 is covered with skins 107 or 117 and the sides within the battery cover are covered with skin portions 105, 106 or 115, 116. The leg 40 is covered with skin 104 or 114. The top of the mid cover 60 is covered with skin 101 or 111.

Figure 11:
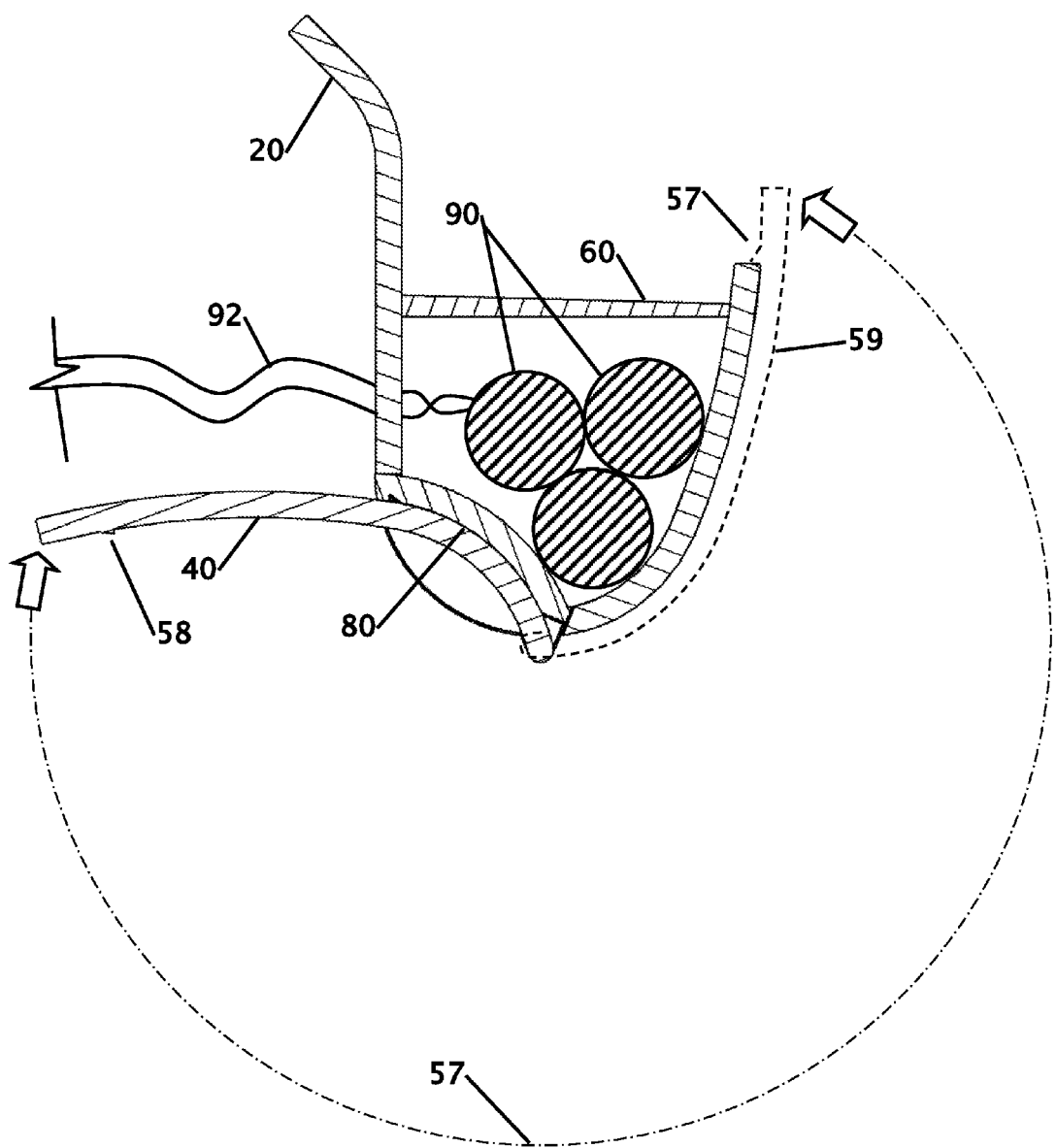
FIG. 11 shows a cross sectional view of a holder showing the internal connected components cut through the middle of the holder.

FIG. 11 shows a cross sectional view of a holder showing the internal connected components cut through the middle of the holder. From this figure the leg 40 is shown with a swing 57 between the two extremes of travel. In the forward position the leg 40 has a hook 58 that engages 57 onto a front edge of the supporting member 20 to retain the leg 40 from swinging. The interaction of the battery cover 80 is shown secured within the supporting member 20 with the mid cover 60 over the top of the batteries 90 within the holder. An optional power cord 92 provides electrical power to charge the batteries 90 and or to charge the game controller (not shown) when the game controller is installed onto the holder. While this figure shows the leg 40 moving through a pivoting axis, it is also contemplated that the leg could also move through a track or can be secured with interference tabs that allows the leg 40 to be removed, rotated (flipped) and then secured to the opposing side of the housing.

Thus, specific embodiments of a holder for a game controller have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A holder for a game controller comprising:
a support structure having at least one pocket that supports at least one game controller;
said support structure further includes a support stand that articulates on said support structure;
said support stand exists in a first extent of said articulation that provides a rear leg that allows said support structure and said at least one game controller to sit in an upright orientation;
said support stand exist in a second extend of said articulation wherein said support stand exists in proximity to cover at least a portion of a front surface of said support structure;
said articulation of said support stand allows said support stand to pivot on said support structure both under said support structure and in-front of said support structure whereby covering at least a portion of said at least one game controller;
said support stand utilizes a first securing tab mechanism that secures into a hole to lock and retain said support stand under said support structure and a securing tab to lock and retain said support stand in-front of said support structure, and
a storage area within said support structure for storage of at least one battery.

2. The holder for a game controller according to claim 1 wherein said storage area is covered by a movable cover.

3. The holder for a game controller according to claim 1 wherein said storage area holds batteries that are used in said at least one game controller.

4. The holder for a game controller according to claim 1 that further includes at least one skin that provides a changeable covering for at least one of said holder and said game controller.

5. The holder for a game controller according to claim 1 wherein said support structure does not restrict use of controls on said at least one game controller when said at least one game controller is seated in said support structure.

6. The holder for a game controller according to claim 1 wherein said support structure supports said game controller by retaining said game controller between two separated hand grips.

7. The holder for a game controller according to claim 1 that further includes charging capability to charge batteries used in said game controller.

8. The holder for a game controller according to claim 1 wherein said articulation is with a pivoting axis, a sliding track or a retaining tabs.

* * * * *